(12) United States Patent
Tsuru et al.

(10) Patent No.: US 10,233,517 B2
(45) Date of Patent: Mar. 19, 2019

(54) COPPER ALLOY SHEET STRIP WITH SURFACE COATING LAYER EXCELLENT IN HEAT RESISTANCE

(71) Applicant: KOBE STEEL, LTD., Kobe-shi (JP)

(72) Inventors: Masahiro Tsuru, Shimonoseki (JP); Shinya Katsura, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/119,975

(22) PCT Filed: Feb. 20, 2015

(86) PCT No.: PCT/JP2015/054829
§ 371 (c)(1),
(2) Date: Aug. 18, 2016

(87) PCT Pub. No.: WO2015/125927
PCT Pub. Date: Aug. 27, 2015

(65) Prior Publication Data
US 2017/0058382 A1    Mar. 2, 2017

(30) Foreign Application Priority Data

Feb. 20, 2014   (JP) .................... 2014-030398

(51) Int. Cl.
*B32B 15/01* (2006.01)
*C22C 9/06* (2006.01)
(Continued)

(52) U.S. Cl.
CPC ............. *C22C 9/06* (2013.01); *B32B 15/01* (2013.01); *B32B 15/043* (2013.01); *B32B 15/20* (2013.01);
(Continued)

(58) Field of Classification Search
CPC ..................................... H01B 1/026
See application file for complete search history.

(56) References Cited

U.S. PATENT DOCUMENTS

| 2003/0091855 A1 | 5/2003 | Tanaka et al. |
| 2003/0129441 A1 | 7/2003 | Hara et al. |
| (Continued) | | |

FOREIGN PATENT DOCUMENTS

| EP | 2 636 769 A2 | 9/2013 |
| EP | 2 644 750 A1 | 10/2013 |
| (Continued) | | |

OTHER PUBLICATIONS

International Preliminary Report on Patentability and Written Opinion dated Sep. 1, 2016 in PCT/JP2015/054829 (with English language translation).

(Continued)

*Primary Examiner* — David Sample
*Assistant Examiner* — Mary I Omori
(74) *Attorney, Agent, or Firm* — Oblon, McClelland, Maier & Neustadt, L.L.P.

(57) ABSTRACT

A copper alloy sheet strip with a surface coating layer, including: a copper alloy sheet strip, as a base material, including copper, 1.0 to 4.5% by mass of Ni and/or Co and 0.2 to 1.0% by mass of Si, based on the total amount of the copper alloy sheet strip; and a surface coating layer including a Ni layer, a Cu—Sn alloy layer and a Sn layer formed on a surface of the copper alloy sheet strip in this order. A Cu—Sn alloy layer is partially exposed on an outermost surface of the surface coating layer such that a surface exposed area ratio is from 3 to 75%. A surface roughness of the surface coating layer is 0.15 µm or more in at least one direction, and 3.0 µm or less in all directions.

20 Claims, 3 Drawing Sheets

(51) Int. Cl.

| | |
|---|---|
| *C25D 7/00* | (2006.01) |
| *C22C 9/02* | (2006.01) |
| *C22C 9/04* | (2006.01) |
| *C22C 9/05* | (2006.01) |
| *C22C 9/10* | (2006.01) |
| *C22F 1/08* | (2006.01) |
| *C25D 5/10* | (2006.01) |
| *C25D 5/50* | (2006.01) |
| *B32B 15/04* | (2006.01) |
| *B32B 15/20* | (2006.01) |
| *C23F 17/00* | (2006.01) |
| *C25D 3/12* | (2006.01) |
| *C25D 3/30* | (2006.01) |
| *C25D 3/38* | (2006.01) |
| *C25D 5/12* | (2006.01) |
| *C25D 17/00* | (2006.01) |

(52) U.S. Cl.
CPC ............... *C22C 9/02* (2013.01); *C22C 9/04* (2013.01); *C22C 9/05* (2013.01); *C22C 9/10* (2013.01); *C22F 1/08* (2013.01); *C23F 17/00* (2013.01); *C25D 3/12* (2013.01); *C25D 3/30* (2013.01); *C25D 3/38* (2013.01); *C25D 5/10* (2013.01); *C25D 5/12* (2013.01); *C25D 5/505* (2013.01); *C25D 7/00* (2013.01); *C25D 17/00* (2013.01)

(56) References Cited

U.S. PATENT DOCUMENTS

| | | | |
|---|---|---|---|
| 2004/0209112 A1 | 10/2004 | Hara et al. | |
| 2005/0037229 A1* | 2/2005 | Tanaka | C23C 26/00 |
| | | | 428/647 |
| 2008/0090096 A1* | 4/2008 | Suzuki | C23C 2/28 |
| | | | 428/674 |
| 2009/0176125 A1 | 7/2009 | Hatano | |
| 2010/0047112 A1* | 2/2010 | Fugono | C22C 9/06 |
| | | | 420/470 |
| 2010/0247959 A1* | 9/2010 | Taira et al. | B23B 15/20 |
| | | | 428/675 |
| 2010/0304016 A1 | 12/2010 | Suzuki et al. | |
| 2011/0266035 A1* | 11/2011 | Sakurai | C25D 5/12 |
| | | | 174/255 |
| 2013/0237105 A1 | 9/2013 | Tsuru et al. | |
| 2013/0255838 A1 | 10/2013 | Katsura | |
| 2013/0260174 A1 | 10/2013 | Tsuru | |
| 2014/0065440 A1* | 3/2014 | Tsuru | C25D 5/12 |
| | | | 428/647 |
| 2014/0134457 A1 | 5/2014 | Sakurai et al. | |

FOREIGN PATENT DOCUMENTS

| | | |
|---|---|---|
| JP | 2003-171790 A | 6/2003 |
| JP | 2003-183882 A | 7/2003 |
| JP | 2004-68026 A | 3/2004 |
| JP | 2006-77307 A | 3/2006 |
| JP | 2006-183068 A | 7/2006 |
| JP | 2007-92173 A | 4/2007 |
| JP | 2007-258156 A | 10/2007 |
| JP | 2007-277715 | 10/2007 |
| JP | 2007-291458 A | 11/2007 |
| JP | 2008-196042 A | 8/2008 |
| JP | 2010-168598 A | 8/2010 |
| JP | 2010-196084 A | 9/2010 |
| JP | 2011-6760 A | 1/2011 |
| JP | 2013-185193 A | 9/2013 |
| JP | 2013-204083 A | 10/2013 |
| JP | 2013-209680 A | 10/2013 |

OTHER PUBLICATIONS

International Search Report dated May 19, 2015 in PCT/JP2015/054829 filed Feb. 20, 2015.
Extended European Search Report dated Sep. 28, 2017 in the corresponding European Application No. 15752056.0 8 pages.
Lei Nie et al., "A Study of Intermetallic Compounds in Tin Bumps during Multi-Reflows", 2006 7$^{th}$ International Conference on Electronic Packaging Technology, DOI: 10. 1109/ICEPT.2006.359794; ISBN: 978-1-4244-0620-3, XP055405215, Aug. 1, 2006, pp. 1-4.

\* cited by examiner

COPPER ALLOY SHEET STRIP WITH SURFACE COATING LAYER EXCELLENT IN HEAT RESISTANCE

TECHNICAL FIELD

The present invention relates to a copper alloy sheet strip with a surface coating layer, which is mainly used as a conductive material for connection components such as terminals in the fields of automobiles and household appliances, and which can maintain contact resistance of the terminal contact section at a low value over a long time.

BACKGROUND ART

In a connector used for connection of electric wires of automobiles etc., a fitting type connection terminal composed of a combination of a male terminal and a female terminal is used. In recent years, electrical components have been mounted in the engine room of automobiles, and there is a need for the connector to ensure electrical characteristics (low contact resistance) after the lapse of a long time at high temperature.

When a copper alloy sheet strip with a surface coating layer, in which a Sn layer is formed as the surface coating layer on the outermost surface, is held over a long time under a high temperature environment, contact resistance increases. Meanwhile, for example, Patent Document 1 (JP 2004-68026 A as Patent Document 1 is incorporated by reference herein) discloses that a surface coating layer to be formed on a surface of a base material (copper alloy sheet strip) is provided with a three-layer structure of ground layer (made of Ni, etc.)/Cu—Sn alloy layer/Sn layer. According to the surface coating layer having this three-layer structure, a ground layer suppresses diffusion of Cu from the base material and a Cu—Sn alloy layer suppresses diffusion of the ground layer, whereby, low contact resistance can be maintained even after the lapse of a long time at high temperature.

Patent Documents 2 to 5 (JP 2006-77307 A as Patent Document 2, JP 2006-183068 A as Patent Document 3, JP 2007-258156 A as Patent Document 4 and JP 2013-185193 A as Patent Document 5) disclose a copper alloy sheet strip with a surface coating layer, including the above-mentioned surface coating layer having a three-layer structure, a Cu—Sn alloy layer being exposed on a surface. Of these, in Patent Documents 2 to 4, a base material having a surface subjected to a roughening treatment is used, and Patent Document 4 discloses Examples in which a Cu—Ni—Si-based alloy is used as a base material. In a copper alloy sheet strip with a surface coating layer disclosed in Patent Document 5, a Cu—Ni—Si-based alloy is used as a base material.

Patent Document 6 (JP 2010-168598 A as Patent Document 6 is incorporated by reference herein) discloses that, in a surface coating layer having a three-layer structure of Ni layer/Cu—Sn alloy layer/Sn layer, a Cu—Sn alloy layer is composed of two phases of a ε (Cu$_3$Sn) phase at the Ni layer side and a η (Cu$_6$Sn$_5$) phase at the Sn phase side, and an area coating ratio of the ε phase, with which the Ni layer is coated, is adjusted to 60% or more. To obtain this surface coating layer, there is a need that a reflow treatment is composed of a heating step, a primary cooling step, and a secondary cooling step; and a temperature rise rate and a reaching temperature are precisely controlled in the heating step, a cooling rate and a cooling time are precisely controlled in the primary cooling step, and a cooling rate is precisely controlled in the secondary cooling step. Patent Document 6 discloses that this surface coating layer enables maintenance of low contact resistance even after the lapse of a long time at high temperature, and also enables prevention of peeling of the surface coating layer.

A Cu—Ni—Si-based copper alloy sheet strip disclosed, for example, in Patent Document 7 (JP 2008-196042 A as Patent Document 7 is incorporated by reference herein) is used as a base material which forms a surface coating layer whose outermost surface is a Sn layer. This copper alloy sheet strip has excellent bending workability, shear punchability and stress relaxation resistance, and a terminal formed from this copper alloy sheet strip is excellent in stress relaxation resistance, so that the terminal has high holding stress even after the lapse of a long time at high temperature, thus enabling maintenance of high electric reliability (low contact resistance).

PRIOR ART DOCUMENT

Patent Document

Patent Document 1: JP 2004-68026 A
Patent Document 2: JP 2006-77307 A
Patent Document 3: JP 2006-183068 A
Patent Document 4: JP 2007-258156 A
Patent Document 5: JP 2013-185193 A
Patent Document 6: JP 2010-168598 A
Patent Document 7: JP 2008-196042 A

DISCLOSURE OF THE INVENTION

Problems to be Solved by the Invention

Patent Documents 1 to 3 and 5 disclose that low contact resistance was maintained even after the lapse of a long time at high temperature (at 160° C. for 120 hours). Patent Documents 4 and 6 discloses that low contact resistance was maintained even after the lapse of a long time at high temperature (at 175° C. for 1,000 hours) and also peeling of the surface coating layer did not occur after the lapse of a long time at high temperature (at 175° C. for 1,000 hours or at 160° C. for 250 hours).

In the measurement of contact resistance and the test of thermal peeling resistance disclosed in Patent Documents 1 to 6, elastic stress is not applied to a test specimen while holding the test specimen at high temperature over a long time. Meanwhile, in an actual fitting type terminal, a male terminal and a female terminal keep in contact with each other by elastic stress at the fitting section. When the male or female terminal is formed using the copper alloy sheet strip with a surface coating layer in which the surface coating layer having a three-layer structure is formed, followed by holding under a high temperature environment in a state of being fitted with each female or male terminal, elastic stress activates change in phase from a ε phase to a η phase as well as diffusion of elements of a base material and a ground layer. Therefore, contact resistance is likely to increase after the lapse of a long time at high temperature, and also peeling is likely to occur at an interface between a base material and a surface coating layer or an interface between a ground layer and a Cu—Sn alloy layer.

These problems also occur when using, as the material of a male or female terminal, a copper alloy sheet strip with a surface coating layer, which is obtained by using the copper alloy sheet strip disclosed in Patent Documents 7 is used as a base material and forming the above-mentioned surface coating layer having a three-layer structure, thus requiring an improvement thereof.

The present invention is directed to an improvement in a copper alloy sheet strip with a surface coating layer in which the above-mentioned surface coating layer having a three-layer structure is formed on a surface of a base material composed of a Cu—(Ni,Co)—Si-based copper alloy sheet strip. A main object of the present invention is to provide a copper alloy sheet strip with a surface coating layer, which can maintain low contact resistance even after the lapse of a long period of time at high temperature in a state applying elastic stress. Another object of the present invention is to provide a copper alloy sheet strip with a surface coating layer, which has excellent thermal peeling resistance even after the lapse of a long period of time at high temperature in a state applying elastic stress.

Means for Solving the Problems

The copper alloy sheet strip with a surface coating layer according to the present invention includes a copper alloy sheet strip, as a base material, consisting of 1.0 to 4.5% by mass of one or more of Ni and Co and 0.2 to 1.0% by mass of Si, with the balance being copper and inevitable impurities; and the surface coating layer composed of a Ni layer, a Cu—Sn alloy layer, and a Sn layer formed on a surface of the copper alloy sheet strip in this order. The Ni layer has an average thickness of 0.1 to 3.0 μm, the Cu—Sn alloy layer has an average thickness of 0.2 to 3.0 μm, and the Sn layer has an average thickness of 0.05 to 5.0 μm. The Cu—Sn alloy layer is partially exposed on the outermost surface of the surface coating layer and a surface exposed area ratio thereof is in a range of 3 to 75%. Surface roughness of the surface coating layer is 0.15 μm or more in terms of arithmetic average roughness Ra in at least one direction, and 3.0 μm or less in terms of arithmetic average roughness Ra in all directions. The Cu—Sn alloy layer is composed only of a η phase ($Cu_6Sn_5$), or a ε phase ($Cu_3Sn$) and a η phase. When the Cu—Sn alloy layer is composed of the ε phase and the η phase, the ε phase exists between the N layer and the η phase, a ratio of the average thickness of the ε phase to the average thickness of the Cu—Sn alloy layer is 30% or less, and a ratio of the length of the c phase to the length of the Ni layer is 50% or less. The Ni layer and the Sn layer include, in addition to Ni and Sn metals, a Ni alloy and a Sn alloy, respectively.

The copper alloy sheet strip with a surface coating layer has the following desirable embodiments.
(1) The copper alloy sheet strip as a base material has an average grain size of 10 μm or less and standard deviation σ of the grain size satisfies the inequality expression: 2σ<10 μm, and the existing amount of dispersed particles having a grain size of 30 to 300 nm existing on grain boundaries is 500 particles/mm or more.
(2) The copper alloy sheet strip as a base material further includes one or more of Sn: 0.01 to 1.3% by mass, Mg: 0.005 to 0.2% by mass, Zn: 0.01 to 5% by mass, Mn: 0.01 to 0.5% by mass, Cr: 0.001 to 0.3% by mass and P: 0.005 to 0.15% by mass.
(3) The copper alloy sheet strip as a base material includes one or more element(s) selected from the group consisting of B, C, S, Ca, V, Ga, Ge, Nb, Mo, Hf, Ta, Bi and Pb: 0.0001 to 0.1% by mass respectively and 0.1% by mass or less in total, one or more element(s) selected from the group consisting of Be, Al, Ti, Fe, Zr, Ag, Cd, In, Sb, Te and Au: 0.001 to 1% by mass respectively and 1% by mass or less in total, and both element groups: 1% by mass or less in total.
(4) A Co layer or a Fe layer is formed in place of the Ni layer, and the Co layer or the Fe layer has an average thickness of 0.1 to 3.0 μm.
(5) When the Ni layer exists, a Co layer or a Fe layer is formed between a surface of the base material and the Ni layer, or between the Ni layer and the Cu—Sn alloy layer, and the total average thickness of the Ni layer and the Co layer or the Ni layer and the Fe layer is in a range of 0.1 to 3.0 μm.
(6) On the material surface (surface of the surface coating layer) after heating in atmospheric air at 160° C. for 1,000 hours, $Cu_2O$ does not exist at a position deeper than 15 nm from the outermost surface.

Effects of the Invention

According to the present invention, it is possible to maintain excellent electrical characteristics (low contact resistance) after heating at high temperature over a long time in a state of applying elastic stress in a copper alloy sheet strip with a surface coating layer, using a Cu—Ni—Si-based copper alloy sheet strip as a base material. Therefore, this copper alloy sheet strip with a surface coating layer is suited for use as a material of a multipole connector to be disposed under a high temperature atmosphere, for example, the engine room of automobiles.

In a cross-section of a surface coating layer, a ratio of the length of the ε phase to the length of the Ni layer is adjusted to 50% or less, whereby, excellent thermal peeling resistance can be obtained even after the lapse of a long time at high temperature in a state of applying elastic stress.

Since a Cu—Sn alloy layer is partially exposed on the outermost surface of the surface coating layer, the copper alloy sheet strip with a surface coating layer according to the present invention can suppress a friction coefficient to be low, and is particularly suited for use as a material for a fitting type terminal.

MODE FOR CARRYING OUT THE INVENTION

Figure 1:
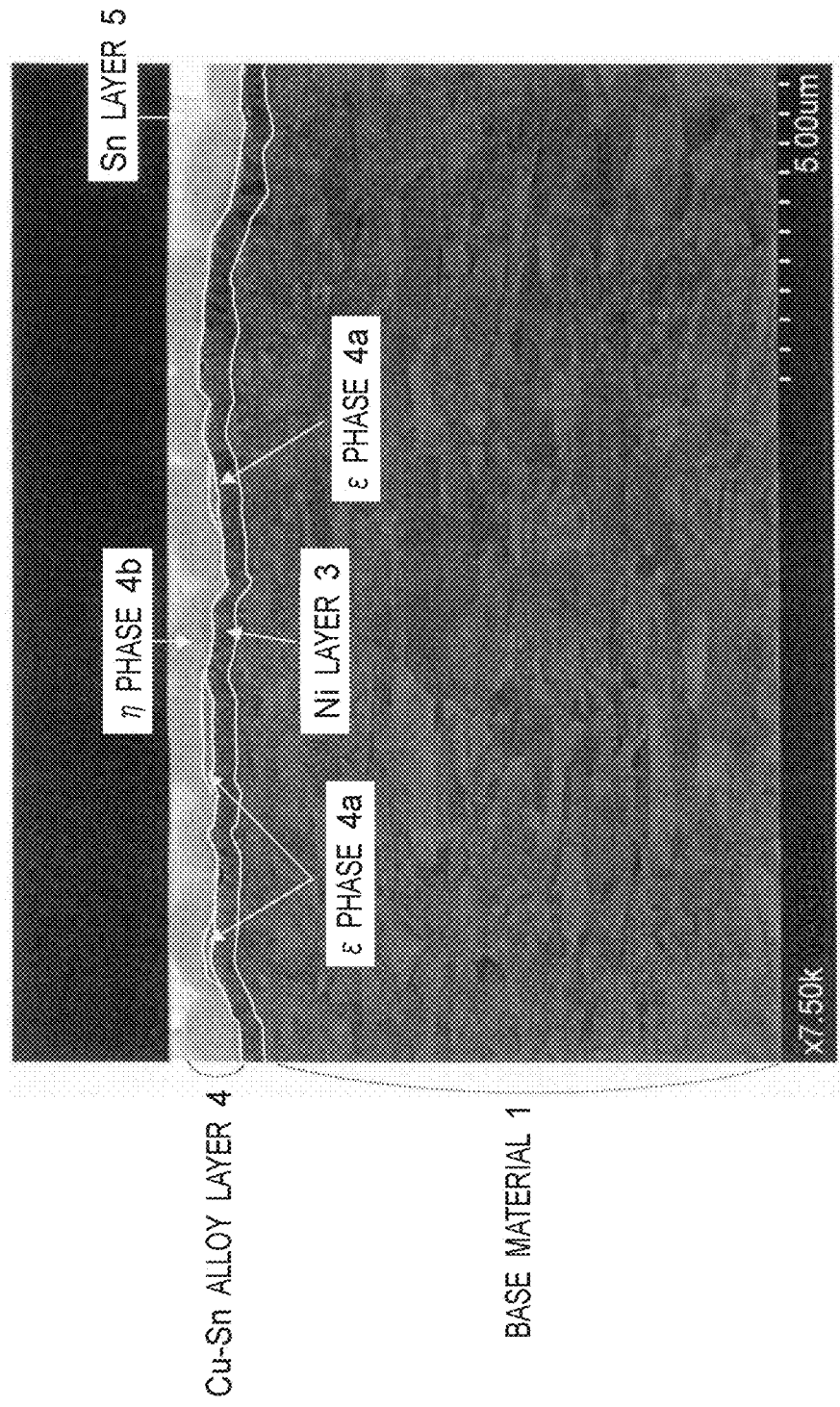
FIG. 1 shows a cross-sectional composition image taken by a scanning electron microscope of the test material No. 20 of Examples.

The structure of the copper alloy sheet strip with a surface coating layer according to the present invention will be specifically described below.

(I) Copper Alloy Sheet Strip as Base Material
(1) Chemical Composition of Copper Alloy Sheet Strip Chemical composition of a Cu—Ni—Si-based copper alloy sheet strip (base material) according to the present invention is as basically mentioned in detail in Patent Document 7.

Ni and Si are precipitated as $Ni_2Si$ in a copper alloy by subjecting to an aging treatment, thus enabling an improvement in strength and conductivity of the copper alloy. However, when the content of Ni is less than 1.0% by mass or the content of Si is less than 0.2% by mass, it is impossible to obtain the target strength. Meanwhile, when the content of Ni exceeds 4.5% by mass or the content of Si exceeds 1.0% by mass, conductivity is degraded. Therefore, the content of Ni is set in a range of 1.0 to 4.5% by mass, and the content of Si is set in a range of 0.2 to 1.0% by mass. The upper limit of the content of Ni is preferably 3.9% by mass, and more preferably 3.3% by mass, while the lower limit is preferably 1.5% by mass, and more preferably 1.7% by mass. The upper limit of the content of Si is preferably 0.90% by mass, and more preferably 0.75% by mass, while the lower limit is preferably 0.25% by mass, and more preferably 0.35% by mass.

In the copper alloy according to the present invention, the content of Ni can be partially or entirely replaced by Co. Co is precipitated as $Co_2Si$ and/or $(Ni,Co)_2Si$ together with Si. The total content of Ni and Co (including the case where the content of Ni is 0% by mass) is set in a range of 1.0 to 4.5% by mass. The upper limit of the total content of Ni and Co is preferably 3.9% by mass, more preferably 3.3% by mass, while the lower limit is preferably 1.5% by mass, and more preferably 1.7% by mass.

If necessary, the copper alloy according to the present invention can further include, as the secondary component, Sn, Mg, Zn, Mn, Cr and the like.

Sn is an element that is solid-soluted in a Cu matrix to thereby increase the strength. There is a need to set the content of Sn at 0.01% by mass or more for that. Meanwhile, when the content of Sn exceeds 1.3% by mass, conductivity is degraded and hot workability is degraded. Therefore, the content of Sn is set in a range of 0.01 to 1.3% by mass. The upper limit of the content of Sn is preferably 0.6% by mass, and more preferably 0.3% by mass.

Mg is solid-soluted in a Cu matrix to thereby increase the strength. There is a need to set the content of Mg at 0.005% by mass or more for that. Meanwhile, when the content of Mg exceeds 0.2% by mass, bending workability and conductivity are degraded. Therefore, the content of Mg is set in a range of 0.005 to 0.2% by mass. The upper limit of the content of Mg is preferably 0.15% by mass, and more preferably 0.05% by mass.

Zn improves thermal peeling resistance of a surface coating layer of a copper alloy sheet. There is a need to set the content of Zn at 0.01% by mass or more for that. Meanwhile, when the content of Zn exceeds 5% by mass, bending workability and conductivity are degraded. Therefore, the content of Zn is set in a range of 0.01 to 5% by mass. The upper limit of the content of Zn is preferably 2% by mass, and more preferably 1.2% by mass.

Mn and Cr have the effect of improving hot rollability of a copper alloy sheet, and one or more of them is/are added, if necessary. There is a need that the content of Mn is set at 0.01% by mass or more and the content of Cr is set at 0.001% by mass or more. Meanwhile, when the content of Mn exceeds 0.5% by mass, conductivity is degraded, and when the content of Cr exceeds 0.3% by mass, crystallized products are formed, thus degrading various properties such as formability. Therefore, the content of Mn is set in a range of 0.01 to 0.5% by mass, and the content of Cr is set in a range of 0.001 to 0.3% by mass. The upper limit of the content of Mn is preferably 0.3% by mass, and the upper limit of the content of Cr is preferably 0.1% by mass.

P forms a compound together with an element such as Ni, Co, Mg, Mn or Cr to thereby precipitate in a mother phase, thus improving the strength and conductivity of a copper alloy. To exert the effect, there is a need to set the content of P at 0.005% by mass or more. Meanwhile, when the content of P exceeds 0.15% by mass, P is segregated on grain boundaries to thereby degrade hot workability. Therefore, the content of P is set in a range of 0.005 to 0.15% by mass.

Each of elements B, C, S, Ca, V, Ga, Ge, Nb, Mo, Hf, Ta, Bi and Pb has the effect of improving press punchability. When the content of each element is less than 0.0001% by mass, no effect is exerted, and when the content exceeds 0.1% by mass, hot rollability is degraded. Each of elements Be, Al, Ti, Fe, Zr, Ag, Cd, In, Sb, Te and Au has the effect of improving press punchability, and coexists with precipitates such as $Ni_2Si$ to thereby increase the strength. Ti and Zr have the effect further improving hot rollability. When the content of each element is less than 0.001% by mass, no effect is exerted, and when the content exceeds 1% by mass, hot rollability and cold rollability are degraded. Therefore, when the element is added, the content of each element is set in a range of 0.0001 to 0.1% by mass (and 0.1% by mass or less in total when two or more elements are added) for the group of B to Pb, while the content of each element is set in a range of 0.001 to 1% by mass (and 0.1% by mass or less in total when two or more elements are added) for the group of Be to Au. When elements of both groups are added, the content is set at 1% by mass or less in total.

(2) Structure of Copper Alloy Sheet Strip

In the copper alloy sheet strip (base material) according to the present invention, as mentioned in detail in Patent Document 7, it is desirable that the average grain size is 10 µm or less, and standard deviation σ of the grain size satisfies the inequality expression: $2\sigma < 10$ µm. Standard deviation σ of the grain size is an average of deviation of grain sizes of individual grains from the average grain size. If grain size distribution approximates to normal distribution, about 95% of all grains have the grain size in a range of $(d-2\sigma)$ µm to $(d+2\sigma)$ µm where d denotes an average grain size. Namely, the existing proportion of coarse grains having a grain size, that greatly exceeds the average grain size, is very small.

When the average grain size exceeds 10 µm or standard deviation σ of the grain size does not satisfy the inequality expression: $2\sigma < 10$ µm, bending workability is degraded in both Good Way (G.W.) and Bad Way (B.W.). The average grain size d and standard deviation σ preferably satisfy a relation: $d \leq 2\sigma$, and the average grain size is preferably 5 µm or less. The lower limit of the average grain size d is not particularly limited and, in the copper alloy sheet with the composition of the present invention, the lower limit in actual operation is about 3.0 µm at the present time.

(3) Method for Producing Copper Alloy Sheet Strip

A copper alloy sheet strip (base material) with the above-mentioned structure (grain size distribution) can be produced by the production method mentioned in Patent Document 7. The production process (see FIG. 1 of Patent Document 7) includes the steps of melting/casting, soaking treatment, hot rolling, precipitation treatment after hot rolling, cold rolling, recrystallization treatment involving a solution treatment, cold rolling, precipitation treatment and low temperature annealing.

The soaking treatment is performed under the conditions of holding at 850° C. or higher for 10 minutes or more, and then hot rolling is performed. The cooling rate up to 700° C. after initiation of hot rolling is set at 20° C./minute or more, including during hot rolling. When the cooling rate up to 700° C. is lower than this cooling rate, coarsened precipitate particles are formed, leading to lack of precipitate particles that exert the pinning effect in the recrystallization treatment involving a solution treatment as the subsequent step, and suppression of precipitation of fine precipitate particles having the strengthening effect.

After hot rolling, the precipitation treatment is performed under the conditions of holding in a temperature range of 300 to 600° C. for 10 minutes or more during cooling after hot rolling, followed by rapid cooling. From 700° C. to a holding temperature of this precipitation treatment, cooling may be performed at a cooling rate of 20° C./minute or more after cooling from the initiation of hot rolling to 700° C., but this is not indispensable. This precipitation treatment enables precipitation of dispersed particles that exert the pinning effect in the subsequent recrystallization treatment. When the holding temperature is lower than 300° C. or higher than 600° C., or the holding times is less than 10 minutes, insufficient precipitation occurs, leading to lack of dispersed particles that exert the pinning effect. Another method of precipitating dispersed particles that exert the pinning effect include a method in which a hot-rolled material or a cold-rolled material is heat-treated by re-heating until a recrystallization treatment involving a solution treatment after completion of hot rolling to thereby precipitate dispersed particles such as $Ni_2Si$.

After hot rolling, the degree of cold rolling is 50% or more, and desirably 80% or more. The cold rolling enables introduction of nucleation sites for recrystallization.

In the recrystallization treatment involving a solution treatment, the conditions are selected so as not to completely solutionize precipitates. Specifically, the conditions are selected from the conditions of holding at a temperature range of 600 to 950° C., and desirably 650 to 900° C., for 3 minutes or less. Depending on the contents of Ni, Co and Si in a copper alloy, suitable temperature of the recrystallization treatment varies. There is a need to hold at a lower temperature side within the above range for small contents of Ni, Co and Si, and to hold at a higher temperature side within the above range for large contents of Ni, Co and Si. Specifically, the temperature substantially proportional to the contents of Ni, Co and Si is selected within the above range. Within this temperature range, a precipitation/solid-solution reaction in equilibrium with the holding temperature occurs to give certain amount of precipitates, or precipitates grown during heating cannot be completely solutionized due to heating within a short time, and the thus obtained precipitates exert the pinning effect during the recrystallization treatment to thereby prevent coarsening of recrystallized grains. Though varying depending on the contents of Ni, Co and Si and on the holding temperature, desired holding time becomes shorter when holding at higher temperature. After the treatment, cooling is performed at a cooling rate of 50° C./second or more.

After the recrystallization treatment involving a solution treatment, cold rolling is performed at a working ratio of 50% or less. High working ratio of cold rolling may cause degradation of bending workability, so that the working ratio is desirably 50% or less. Cold rolling enables introduction of nucleation sites for recrystallization.

Subsequently, a precipitation treatment is performed at 350 to 500° C. for 30 minutes to 24 hours. These conditions are the same as in conventional method. When the holding temperature is lower than 350° C., insufficient precipitation of $Ni_2Si$ occurs. When the holding temperature exceeds 500° C., the strength of the copper alloy sheet decreases, thus failing to obtain requisite proof stress. When the holding time is less than 30 minutes, insufficient precipitation of $Ni_2Si$ occurs. When the holding times exceeds 24 hours, productivity is suppressed.

If necessary, low-temperature annealing is carried out by holding at a temperature of 300 to 600° C. for 1 second to 1 minute, for relieving strain.

In a copper alloy sheet strip (base material) having the above structure (grain size distribution), observing a distribution state of dispersed particles on grain boundaries, dispersed particles having a grain size of 30 to 300 nm exist in the amount of 500 particles/mm or more. In general, precipitates precipitated during the precipitation treatment after quenching, which is in turn carried out after the solution treatment, are fine and generally have a grain size of from several nanometers to less than 30 nanometers, and most of which have a grain size of less than 10 nanometers. Meanwhile, crystals are coarse, most of which generally have a grain size of more than 300 nm. It is therefore estimated that all or most of dispersed precipitates having a grain size of 30 to 300 nm existing on grain boundaries in the copper alloy sheet as a final product are precipitates ($Ni_2Si$) which have been produced in the precipitation treatment after hot rolling and which have remained without completely being solutionized during the recrystallization treatment involving a solution treatment, and that these precipitates exert the pinning effect of grain boundaries to prevent recrystallized grains from becoming coarse during the recrystallization treatment. The amount of dispersed particles having a diameter of 30 to 300 nm is preferably 1,000 particles/mm or more. The upper limit of the number is not particularly limited, but the advantages of the dispersed precipitates may be substantially saturated in the amount of 10,000 particles/mm.

(II) Surface Coating Layer (1) Average Thickness of Ni Layer

The Ni layer, as a ground layer, suppresses diffusion of a base material constituent element to the material surface to thereby suppress growth of a Cu—Sn alloy layer, thus preventing consumption of a Sn layer, leading to suppression of an increase in contact resistance after use at high temperature over a long time. However, when a Ni layer has an average thickness of less than 0.1 μm, it becomes impossible to sufficiently exert the effect because of increasing of pit defects in the Ni layer. Meanwhile, when the Ni layer becomes thick, namely, the average thickness thereof becomes more than 3.0 μm, the effect is saturated, thus degrading formability into a terminal, such as occurrence of cracking during bending, and also degrading productivity and economy. Therefore, the average thickness of the Ni layer is set in a range of 0.1 to 3.0 μm. Regarding the average thickness of the Ni layer, preferably, the lower limit is 0.2 μm and the upper limit is 2.0 μm.

A small amount of a component element included in the base material may be mixed in the Ni layer. When a Ni coating layer is made of a Ni alloy, examples of constituents other than Ni of the Ni alloy include Cu, P, Co and the like. Preferably, the proportion of Cu in the Ni alloy is 40% by mass or less, and the proportions of P and Co are 10% by mass or less.

(2) Average Thickness of Cu—Sn Alloy Layer

The Cu—Sn alloy layer prevents diffusion of Ni into the Sn layer. When the Cu—Sn alloy layer has an average thickness of less than 0.2 μm, the effect of preventing diffusion is insufficient, so that Ni diffuses into the Cu—Sn alloy layer or a surface layer of the Sn layer to form an oxide. Since volume resistivity of oxide of Ni is at least 1,000 times larger than that of oxide of Sn and oxide of Cu, contact resistance increases, thus degrading electric reliability. Meanwhile, when the average thickness of the Cu—Sn alloy layer exceeds 3.0 μm, formability into a terminal is degraded, that is, cracking occurs during bending. Therefore, the average thickness of the Cu—Sn alloy layer is set in a range of 0.2 to 3.0 μm. Regarding the average thickness of the Cu—Sn alloy layer, the lower limit is preferably 0.3 μm, while the upper limit is preferably 2.0 μm, and more preferably 1.0 μm.

(3) Phase Structure of Cu—Sn Alloy Layer

The Cu—Sn alloy layer is composed only of a η phase ($Cu_6Sn_5$), or a ε phase ($Cu_3Sn$) and a η phase. When the Cu—Sn alloy layer is composed of a ε phase and a η phase, the ε phase is formed between the Ni layer and the η phase, and is in contact with the Ni layer. The Cu—Sn alloy layer is a layer that is formed as a result of a reaction of Cu of a Cu plating layer with Sn of a Sn plating layer by a reflow treatment. When a relation between the thickness (ts) of Sn plating and the thickness (tc) of Cu plating before the reflow treatment is expressed by the inequality expression: $ts/tc > 2$, only a η phase is formed in an equilibrium state. However, actually, a ε phase as a non-equilibrium phase is also formed according to the reflow treatment conditions.

Since the ε phase is hard as compared with the η phase, a coating layer becomes hard if the ε phase exists, thus contributing to a decrease in friction coefficient. However, when the ε phase has a large average thickness, the ε phase is brittle as compared with the η phase, thus degrading formability into a terminal, such as occurrence of cracking during bending. If the F phase as a nonequilibrium phase is converted into the η phase as an equilibrium phase at a temperature of 150° C. or higher, and Cu of the ε phase is thermally diffused into the η phase and the Sn layer to thereby reach a surface of the Sn layer, the amount of oxide of Cu ($Cu_2O$) on the material surface increases and thus contact resistance is likely to increase, so that it becomes difficult to maintain reliability of electrical connection. Furthermore, thermal diffusion of Cu of the ε phase leads to formation of voids at an interface between the Cu—Sn alloy layer and the ground layer (including, in addition to the Ni layer, below-mentioned Co layer and Fe layer) at a place where the ε phase existed, so that peeling is likely to occur at the interface between the Cu—Sn alloy layer and the ground layer. For these reasons, a ratio of the average thickness of the ε phase to the average thickness of the Cu—Sn alloy layer is set at 30% or less. When the Cu—Sn alloy layer is composed only of the η phase, this ratio is 0%. The ratio of the average thickness of the ε phase to the average thickness of the Cu—Sn alloy layer is preferably 20% or less, and more preferably 15% or less.

To more effectively suppress peeling at the interface between the Cu—Sn alloy layer and the ground layer, it is desirable to set a ratio of the length of the ε phase to the length of the ground layer in a Cross-section of the surface coating layer at 50% or less, in addition to the above-mentioned limitation. This is because the voids are generated at the place where the ε phase existed. The ratio of the length of the ε phase to the length of the ground layer is preferably 40% or less, and more preferably 30% or less. When the Cu—Sn alloy layer is composed only of the η phase, this ratio is 0%.

(4) Average Thickness of Sn Layer

When the Sn layer has an average thickness of less than 0.05 μm, the amount of oxide of Cu on the material surface due to thermal diffusion such as high temperature oxidation increases, so that contact resistance is likely to increase and also corrosion resistance is degraded, thus making it difficult to maintain reliability of electrical connection. When the average thickness of the Sn layer becomes less than 0.05 μm, a friction coefficient increases and an insertion force when formed into a fitting terminal increases. Meanwhile, when the average thickness of the Sn layer exceeds 5.0 μm, it is economically disadvantageous and also productivity is degraded. Therefore, the average thickness of the Sn layer is set in a range of 0.05 to 5.0 μm. The lower limit of the average thickness of the Sn layer is preferably 0.1 μm, and more preferably 0.2 μm, while the upper limit of the average thickness of the Sn layer is preferably 3.0 μm, more preferably 2.0 μm, and still more preferably 1.5 μm. When low insertion force is considered to be important as the terminal, the average thickness of the Sn layer is preferably set in a range of 0.05 to 0.4 μm.

When the Sn layer is made of a Sn alloy, examples of constituents other than Sn of the Sn alloy include Pb, Si, Zn, Ag, Cu and the like. The proportion of Pb in the Sn alloy is preferably less than 50% by mass, and the proportion of the other element is preferably less than 10% by mass.

(5) Exposed Area Ratio Cu—Sn Alloy Layer

When reduction in friction is required when a male terminal and a female terminal are inserted or extracted, the Cu—Sn alloy layer may be partially exposed on the outermost surface of the surface coating layer. The Cu—Sn alloy layer is very hard as compared with Sn or a Sn alloy that forms the Sn layer, and partial exposure of the Cu—Sn alloy layer on the outermost surface enables suppression of deformation resistance due to digging up of the Sn layer when the terminal is inserted or extracted, and shearing resistance to shear adhesion of Sn—Sn, thus making it possible to significantly reduce a friction coefficient. The Cu—Sn alloy layer that is exposed on the outermost surface of the surface coating layer is a η phase and, when the exposed area ratio is less than 3%, the friction coefficient is not sufficiently reduced, thus failing to sufficiently obtain the effect of reducing an insertion force of the terminal. Meanwhile, when the exposed area ratio of the Cu—Sn alloy layer exceeds 75%, the amount of oxide of Cu on the surface of the surface coating layer (Sn layer) due to the lapse of time and corrosion increases and contact resistance is likely to increase, thus making it difficult to maintain reliability of electrical connection. Therefore, the exposed area ratio of the Cu—Sn alloy layer is set in a range of 3 to 75% (see Patent Documents 2 and 3). Regarding the exposed area ratio of the Cu—Sn alloy layer, preferably, the lower limit is 10% and the upper limit is 60%, and more preferably, the lower limit is 15% and the upper limit is 50%.

The exposure conformation of the Cu—Sn alloy layer that is exposed on the outermost surface of the surface coating layer includes various forms. Patent Documents 2 and 3 disclose a random structure in which the exposed Cu—Sn alloy layer is irregularly distributed, and a linear structure in which the exposed Cu—Sn alloy layer extends in parallel. Patent Document 4 discloses a random structure in which the exposed Cu-Sri alloy layers is irregularly distributed, and Patent Document 5 discloses a linear structure in which the exposed Cu—Sn alloy layer extends in parallel with the rolling direction. JP 2013-209680 A discloses a composite conformation composed of a random structure in which the exposed Cu—Sn alloy layer is irregularly distributed and a linear structure in which the exposed Cu—Sn alloy layer extends in parallel with the rolling direction. In the copper alloy sheet strip with a surface coating layer according to the present invention, all of these exposure conformations are permitted.

When the exposure conformation of the Cu—Sn alloy layer is a random structure, the friction coefficient decreases regardless of the insertion or extraction direction of the terminal. Meanwhile, in case the exposure conformation of the Cu—Sn alloy layer is a linear structure, or a composite conformation composed of a random structure and a linear structure, the friction coefficient becomes lowest when the insertion or extraction direction of the terminal is a direction vertical to the linear structure. Therefore, when the insertion or extraction direction of the terminal is set at the rolling vertical direction, the linear structure is desirably formed in the rolling parallel direction.

(6) Surface Roughness of Surface Coating Layer

The copper alloy sheet strip with a surface coating layer mentioned in Patent Document 3 is produced by subjecting a base material (copper alloy sheet strip itself) to a roughening treatment, and subjecting a surface of the base material to Ni plating, Cu plating and Sri plating in this order, followed by a reflow treatment. The surface roughness of the base material subjected to the roughening treatment is set at 0.3 μm or more in terms of arithmetic average roughness Ra in at least one direction, and 4.0 μm or less in terms of arithmetic average roughness Ra in all directions. Regarding the thus obtained copper alloy sheet strip with a surface coating layer, surface roughness of the surface coating layer is 0.15 μm or more in terms of arithmetic average roughness Ra in at least one direction, and 3.0 μm or less in terms of arithmetic average roughness Ra in all directions. Since the base material has unevenness on a surface after roughening, and the Sn layer is smoothened by the reflow treatment, the Cu—Sn alloy layer exposed on the surface after the reflow treatment partially protrudes from the surface of the Sn layer.

Also in the copper alloy sheet strip with a surface coating layer according to the present invention, like the copper alloy sheet strip with a surface coating layer mentioned in Patent Document 3, the Cu—Sn alloy layer is partially exposed, thus setting surface roughness of the surface coating layer at 0.15 μm or more in terms of arithmetic average roughness Ra in at least one direction, and 3.0 μm or less in terms of arithmetic average roughness Ra in all directions. Preferably, arithmetic average roughness Ra in at least one direction is 0.2 μm or more, and arithmetic average roughness Ra in all directions is 2.0 μm or less.

(7) Surface Exposure Distance of Cu—Sn Alloy Layer

In the surface coating layer in which a Cu—Sn alloy layer is partially exposed on the outermost surface, it is desirable that an average surface exposure distance of the Cu—Sn alloy layer in at least one direction of the surface is set in a range of 0.01 to 0.5 mm, like the copper alloy sheet strip with a surface coating layer mentioned in Patent Document 3. Herein, the average surface exposure distance of the Cu—Sn alloy layer is defined as a value obtained by adding an average width of the Sn layer to an average width (length along a straight line) of the Cu—Sn alloy layer that crosses a straight line drawn on a surface of the surface coating layer.

When the average surface exposure distance of the Cu—Sn alloy layer is less than 0.01 mm, the amount of oxide of Cu on the material surface due to thermal diffusion such as high temperature oxidation increases, so that contact resistance is likely to increase, thus making it difficult to maintain reliability of electrical connection. Meanwhile, when the average surface exposure distance of the Cu—Sn alloy layer exceeds 0.5 mm, it becomes difficult to obtain a low friction coefficient when particularly used as a down-sized terminal. In general, when the terminal is down-sized, the contact area of an electric contacting point (insertion or extraction section) such as indent or rib decreases, thus increasing contact probability between only Sn layers during insertion or extraction. Whereby, the amount of adhesion increases, thus making it difficult to obtained a low friction coefficient. Therefore, it is desirable to set the average surface exposure distance of the Cu—Sn alloy layer in a range of 0.01 to 0.5 mm in at least one direction. More desirably, the average surface exposure distance of the Cu—Sn alloy layer is set in a range of 0.01 to 0.5 mm in all directions. Whereby, contact probability between only Sn layers during insertion or extraction decreases. Regarding the average surface exposure distance of the Cu—Sn alloy layer, preferably, the lower limit is 0.05 mm and the upper limit is 0.3 mm.

The Cu—Sn alloy layer formed between the Cu plating layer and the molten Sn plating layer usually grows while reflecting a surface conformation of a base material (copper alloy sheet strip) and surface exposure distance of the Cu—Sn alloy layer in the surface coating layer nearly reflects an unevenness average distance Sm of a surface of the base material. Therefore, in order to adjust the average surface exposure distance of the Cu—Sn alloy layer in at least one direction of a surface of a coating layer in a range of 0.01 to 0.5 mm, it is desirable that the unevenness average distance Sm calculated in at least one direction of the surface of the base material (copper alloy sheet strip) is set in a range of 0.01 to 0.5 mm. Regarding the unevenness average distance Sm, preferably, the lower limit is 0.05 mm and the upper limit is 0.3 mm.

(8) Average Thickness of Co Layer and Fe Layer

Like the Ni layer, the Co layer and the Fe layer are useful to suppress diffusion of base material constituent elements into the material surface to thereby suppress growth of the Cu—Sn alloy layer, leading to prevention of consumption of the Sn layer, suppression of an increase in contact resistance after use at high temperature over a long time, and achievement of satisfactory solder wettability. Therefore, the Co layer or the Fe layer can be used as a ground layer in place of the Ni layer. However, when the average thickness of the Co layer or Fe layer is less than 0.1 μm, like the Ni layer, it becomes impossible to sufficiently exert the effect because of increasing of pit defects in the Co layer or Fe layer. When the Co layer or Fe layer becomes thick, namely, the average thickness thereof becomes more than 3.0 μm, like the Ni layer, the effect is saturated, formability into a terminal degrades, such as occurrence of cracking during bending, and also productivity and economy degrade. Therefore, when the Co layer or Fe layer is used as a ground layer in place of the Ni layer, the average thickness of the Co layer or Fe layer is set in a range of 0.1 to 3.0 μm. Regarding the average thickness of the Co layer or Fe layer, preferably, the lower limit is 0.2 μm and the upper limit is 2.0 μm.

It is also possible to use, as a ground layer, the Co layer and Fe layer together with the Ni layer. In this case, the Co layer or Fe layer is formed between a surface of the base material and the Ni layer, or between the Ni layer and the Cu—Sn alloy layer. The total average thickness of the Ni layer and Co layer, or the total average thickness of the Ni layer and Fe layer is set in a range of 0.1 to 3.0 μm for the same reason in the case where the ground plating layer is only the Ni layer, Co layer or Fe layer. Regarding the total average thickness of the Ni layer and the Co layer, or the Ni layer and Fe layer, preferably, the lower limit is 0.2 μm and the upper limit is 2.0 μm.

(9) Thickness of $Cu_2O$ Oxide Film

After heating in atmospheric air at 160° C. for 1,000 hours, a $Cu_2O$ oxide film is formed by diffusion of Cu on the material surface of a surface coating layer. $Cu_2O$ has extremely high electrical resistivity as compared with $SnO_2$ and CuO, and the $Cu_2O$ oxide film formed on the material surface serves as electric resistance. When the $Cu_2O$ oxide film is thin, contact resistance does not excessively increase because of becoming a state where free electrons pass through the $Cu_2O$ oxide film comparatively easily (tunnel effect). When the thickness of the $Cu_2O$ oxide film exceeds 15 nm ($Cu_2O$ exists at a position deeper than 15 nm from the outermost surface of the material), contact resistance increases. As the proportion of the ε phase in the Cu—Sn alloy layer increases, a thicker $Cu_2O$ oxide film is formed ($Cu_2O$ is formed at a deeper position from the outermost surface). To prevent contact resistance from increasing by limiting the thickness of the $Cu_2O$ oxide film to 15 nm or less, there is a need to set a ratio of the average thickness of the ε phase to the average thickness of the Cu—Sn alloy layer at 30% or less.

(III) Method for Producing Copper Alloy Sheet Strip with Surface Coating Layer

As mentioned in (II) (6), the copper alloy sheet strip with a surface coating layer according to the present invention can be produced by roughening a surface of copper alloy sheet strip as a base material, subjecting the surface of the base material to Ni plating, Cu plating and Sn plating in this order, and performing a reflow treatment. In the reflow treatment, a Cu—Sn alloy layer is formed through mutual diffusion of Cu of the Cu plating layer and Sn of the Sn plating layer, allowing the Cu plating layer to disappear, and allowing the molten and solidified Sn plating layer to appropriately remain on the surface layer section.

It is possible to use, as a plating solution, plating solutions mentioned in Patent Document 1 for Ni plating, Cu plating and Sn plating. Plating conditions may be as follows: Ni plating/current density: 3 to 10 $A/dm^2$, bath temperature: 40 to 55° C., Cu plating/current density: 3 to 10 $A/dm^2$, bath temperature: 25 to 40° C., Sn plating/current density: 2 to 8 $A/dm^2$, and bath temperature: 20 to 35° C. The current density is preferably low.

In the present invention, a Ni plating layer, a Cu plating layer and a Sn plating layer each means a surface plating layer before a reflow treatment. A Ni layer, a Cu—Sn alloy layer and a Sn layer each means a plating layer after a reflow treatment, or a compound layer formed by the reflow treatment.

The thickness of the Cu plating layer and the Sn plating layer is set on the assumption that a Cu—Sn alloy layer formed after a reflow treatment becomes a η single phase in an equilibrium state. Depending on the conditions of the reflow treatment, a ε phase remains without reaching an equilibrium state. To decrease the proportion of the ε phase in the Cu—Sn alloy layer, the conditions may be set so as to approach an equilibrium state by adjusting one or both of the heating temperature and heating time. Namely, it is effective to increase the reflow treatment time and/or to raise the reflow treatment temperature. To set a ratio of the average thickness of the ε phase to the average thickness of the Cu—Sn alloy layer at 30% or less, the condition of the reflow treatment is selected in a range of 20 to 40 seconds at an ambient temperature of a melting point of a Sn plating layer or higher and 300° C. or lower, or selected in a range of 10 to 20 seconds at an ambient temperature of higher than 300° C. and 600° C. or lower. A reflow treatment furnace to be used is a reflow treatment furnace having heat capacity that is sufficiently larger than that of plating material to be subjected to a heat treatment. By selecting the conditions of higher temperature over a longer time within the above range, it is possible to set a ratio of the length of the ε phase to the length of the ground layer at 50% or less in a cross-section of the surface coating layer.

As the cooling rate after the reflow treatment increases, the grain size of the Cu—Sn alloy layer decreases. Whereby, hardness of the Cu—Sn alloy layer increases, so that apparent hardness of the Sn layer increases, which is more effective to reduce a friction coefficient when formed into a terminal. Regarding the cooling rate after the reflow treatment, the cooling rate from a melting point (232° C.) of Sn to a water temperature is preferably set at 20° C./second or more, and more preferably 35° C./second or more. Specifically, it is possible to achieve the cooling rate by continuously quenching a Sn plated material while passing in a water tank at a water temperature of 20 to 70° C. immediately after the reflow treatment, or shower cooling with water at 20 to 70° C. after exiting a reflow heating furnace, or a combination of shower and a water tank. After the reflow treatment, it is desirable to perform heating of the reflow treatment in a non-oxidizing atmosphere or a reducing atmosphere so as to make the Sn oxide film on the surface thin.

As mentioned in (II) (6), surface roughness of the roughened base material is set at 0.3 μm or more in terms of arithmetic average roughness Ra in at least one direction, and 4.0 μm or less in terms of arithmetic average roughness Ra in all directions. As a result, it is possible to produce a copper alloy sheet strip with a surface coating layer, which includes a surface coating layer including a Sn layer having an average thickness of 0.05 to 5.0 μm on the outermost surface, a Cu—Sn alloy layer being partially exposed on the surface.

For roughening of a surface of the copper alloy sheet strip, for example, the copper alloy sheet strip is rolled using a rolling roll roughened by polishing or shot blasting. When using a roll roughened by shot blasting, the exposure conformation of the Cu—Sn alloy layer exposed on the outermost surface of the surface coating layer becomes a random structure. When using a roll roughened by polishing a rolling roll to form deep polishing marks, and forming random unevenness by shot blasting, the exposure conformation of the Cu—Sn alloy layer exposed on the outermost surface of the surface coating layer becomes a composite conformation composed of a random structure and a linear structure extending in parallel with the rolling direction.

In the production process mentioned above, a Ni plating layer, a Cu plating layer and a Sn plating layer include, in addition to Ni, Cu and Sn metals, a Ni alloy, a Cu alloy and a Sn alloy, respectively. When the Ni plating layer is made of a Ni alloy and the Sn plating layer is made of a Sn alloy, it is possible to use each alloy described above as for the Ni layer and the Sn layer. When the Cu plating layer is made of a Cu alloy, examples of constituents other than Cu of the Cu alloy include Sn, Zn, and the like. The proportion of Sn in the Cu alloy is preferably less than 50% by mass, and the proportion of the other element is preferably less than 5% by mass.

In the production process mentioned above, a Co plating layer or a Fe plating layer may be formed as a ground plating layer in place of the Ni plating layer. Alternatively, a Co plating layer or a Fe plating layer may be formed, and then the Ni plating layer may be formed. Alternatively, the Ni plating layer may be formed, and then a Co plating layer or a Fe plating layer may also be formed.

Examples

Each of copper alloys with the compositions of A, B, C, D, E, F and G shown in Table 1 was melted in a kryptol furnace in atmospheric air while charcoal coating, followed by casting. The ingot thus obtained was subjected to a homogenization treatment of holding at 950° C. for 1 hour, followed by hot rolling. After completion of hot rolling at 700° C. or higher to thereby reduce to a thickness of 20 mm, the thus obtained hot-rolled plate was held at 500° C. for 120 minutes during cooling, and then water-cooled to room temperature. The cooling rate during cooling to 500° C. after initiation of hot rolling was set at 50° C./minute.

Thereafter, both sides of the thus obtained hot-rolled plate was ground by 1 mm, cold-rolled (working ratio of 98.6%) to a thickness of 0.3 mm, and subjected to a recrystallization treatment involving, a solution treatment in a salt bath furnace at 720 to 820° C. for 30 to 60 seconds, followed by water cooling. After a heat treatment, a surface of the sheet material was pickled, polished and then roughened by shot blasting. The sheet material was cold-rolled to a thickness of 0.2 mm (working ratio of 33.3%) and then cold-rolled to a thickness of 0.2 mm by a rolling roll roughened by polishing and shot blasting. Whereby, surface-roughened copper alloy sheets with various surface roughnesses (arithmetic average roughness Ra in the rolling vertical direction where surface roughness becomes largest is 0.3 μm or more) and various conformations (Nos. 1 to 31 and 51 to 55 in Tables 2 and 3) were obtained. Only the test material No. 32 was not subjected to a roughening treatment. Thereafter, these copper alloy sheets were subjected to a precipitation treatment in an atmosphere of a hydrogen gas having a dew point of −40° at 450 to 500° C. for 2 hours.

Based on a W bending test defined in Technical Standards of The Japan Copper and Brass Association JCBA T307: 2007, "Evaluation of Bending Workability of Copper And Copper Alloy Sheet Strip", a W bending test at a bending radius R=0.2 mm was performed, using test specimens each having a width of 10 mm and a length of 30 mm in which each direction of L.D. (parallel in the rolling direction) and T.D. (vertical in the rolling direction) is the longitudinal direction. After the W bending test, appearance of the outer bent section was observed at a magnification of 50 times by an optical microscope. In all test specimens, cracking was not observed.

After the precipitation treatment, the copper alloy sheet was used as a plating base material. After pickling and degreasing, the copper alloy sheet was subjected to ground plating (Ni, Co, Fe), Cu plating and Sn plating in each thickness, followed by a reflow treatment to obtain the test materials Nos. 1 to 32 and 51 to 55 shown in Tables 2 and 3. In all test materials, the Cu plating layer disappeared. The conditions of the reflow treatment were as follows: at 300° C. for 20 to 30 seconds or 450° C. for 10 to 15 seconds for the test materials Nos. 1 to 23, 25, 28, 31, 32 and 51 to 55, and conventional conditions (at 280° C. for 8 seconds) for the test materials Nos. 24, 26, 27, 29 and 30.

In the test materials Nos, 1 to 32 and 51 to 55, each average thickness of ground layer (Ni layer, Co layer, Fe layer), a Cu—Sn alloy layer and a Sn layer, a ε phase thickness ratio, a ε phase length ratio, a thickness of a $Cu_2O$ oxide film, and contact resistance after heating at high temperature over a long time were measured, and a test of thermal peeling resistance was performed. Surface roughness of a surface coating layer, and a surface exposed area ratio and a friction coefficient of a Cu—Sn alloy layer were measurement by the following procedure.

(Measurement of Average Thickness of Ni Layer)

Using an X-ray fluorescent analysis thickness meter (manufactured by Seiko Instruments Inc.; SFT3200), an

TABLE 1

| Alloy symbol | Alloy composition (% by mass) | | | | | | | | | | | Average grain size (μm) | Standard deviation 2σ (μm) | Number of grain boundary precipitates ($10^3$ precipitates/mm) | 0.2% Proof stress (MPa) | Conductivity (% IACS) |
|---|---|---|---|---|---|---|---|---|---|---|---|---|---|---|---|---|
| | Ni | Co | Si | Sn | Mg | Zn | Mn | Cr | P | Others | Cu | | | | | |
| A | 1.81 | — | 0.41 | 0.12 | 0.025 | 1.20 | 0.04 | 0.012 | 0.03 | Fe: 0.010, Al: 0.018, Ta: 0.0025 | Balance | 4.2 | 4.6 | 3.9 | 580 | 45 |
| B | 2.51 | — | 0.53 | 0.22 | 0.012 | 1.06 | 0.06 | 0.006 | — | Pb: 0.0025, Zr: 0.005, Ti: 0.005 | Balance | 3.7 | 4.0 | 4.2 | 655 | 41 |
| C | 1.47 | 1.00 | 0.55 | 0.10 | 0.045 | 0.59 | — | 0.09 | — | — | Balance | 3.1 | 3.7 | 5.0 | 755 | 52 |
| D | 2.53 | — | 0.56 | — | — | — | — | — | — | — | Balance | 4.2 | 5.3 | 4.4 | 620 | 47 |
| E | 3.16 | — | 0.71 | 1.25 | — | 0.4 | — | — | — | — | Balance | 3.3 | 3.8 | 4.8 | 736 | 31 |
| F | 3.11 | — | 0.67 | — | — | 0.3 | — | — | — | — | Balance | 4.3 | 5.7 | 4.5 | 721 | 38 |
| G | 2.93 | — | 0.61 | — | 0.16 | — | — | — | — | — | Balance | 4.0 | 5.3 | 4.3 | 696 | 44 |

Using test specimens cut out from the thus obtained copper alloy sheets (Nos. 1, 2, 16, 51, 52, 53 and 54), strength (0.2% proof stress), conductivity, average grain size, standard deviation σ of grain size, and number of dispersed particles having a diameter 30 to 300 nm existing on grain boundaries were measured by the method mentioned in Examples of Patent Document 7. The results are shown in Table 1.

average thickness of a Ni layer of the test material was calculated. Regarding the measurement conditions, a two-layer calibration curve of Sn/Ni/base material was used as a calibration curve, and a collimeter diameter was set at φ0.5 mm.

(Measurement of Average Thickness of Co Layer)

Using an X-ray fluorescent analysis thickness meter (manufactured by Seiko Instruments Inc.; SFT3200), an average thickness of a Co layer of the test material was calculated. Regarding the measurement conditions, a two-layer calibration curve of Sn/Co/base Material was used as a calibration curve, and a collimeter diameter was set at φ0.5 mm.

(Measurement of Average Thickness of Fe Layer)

Using an X-ray fluorescent analysis thickness meter (manufactured by Seiko Instruments Inc.; SFT3200), an average thickness of a Fe layer of the test material was calculated. Regarding the measurement conditions, a two-layer calibration curve of Sn/Fe/base material was used as a calibration curve, and a collimeter diameter was set at φ0.5 mm.

(Measurement of Average Thickness of Cu—Sn Alloy Layer, ε Phase Thickness Ratio, and ε Phase Length Ratio)

A cross-section (cross-section in the rolling vertical direction) of the test material worked by microtome was observed at a magnification of 10,000 times using a scanning electron microscope. An area of a Cu—Sn alloy layer was calculated from the thus obtained cross-sectional composition image by image processing analysis, and a value obtained by dividing by a width of the measured area was regarded as an average thickness. The cross-section of the test material was a cross-section in the rolling vertical direction. In the same composition image, an area of a ε phase was calculated by image analysis and a value obtained by dividing by a width of the measured area was regarded as an average thickness of a ε phase. By dividing the average thickness of the ε phase by the average thickness of the Cu—Sn alloy layer, a ε phase thickness ratio (ratio of the average thickness of the ε phase to the average thickness of the Cu—Sn alloy layer) was calculated. Furthermore, in the same composition image, the length of the ε phase (length along the width direction of the measured area) was measured, and a ε phase length ratio (ratio of the length of the ε phase to the length of the ground layer) was calculated by dividing the length of the ε phase by the length of the ground layer (width of the measured area). Each measurement was carried out in five visual fields and the average thereof was regarded as the measured value.

A cross-sectional composition image (cross-section in the rolling vertical) taken by a scanning electron microscope of the test material No. 20 is shown in FIG. 1. In the same composition image, an outlined line is drawn by tracing the boundary between a Ni layer and a base material, the boundary between a Ni layer and a Cu—Sn alloy layer (η phase and ε phase), and the boundary between a ε phase and a η phase. As shown in FIG. 1, a surface plating layer 2 is formed on a surface of a copper alloy base material 1, and the surface plating layer 2 is composed of a Ni layer 3, a Cu—Sn alloy layer 4 and a Sn layer 5, and the Cu—Sn alloy layer 4 is composed of a ε phase 4a and a η phase 4b. The ε phase 4a is formed between the Ni layer 3 and the η phase 4b, and is in contact with the Ni layer. The ε phase 4a and the η phase 4b of the Cu—Sn alloy layer 4 were confirmed by observation of color tone of a cross-sectional composition image, and quantitative analysis of the Cu content using an energy dispersive X-ray spectrometer (EDX).

(Measurement of Average Thickness of Sn Layer)

First, using an X-ray fluorescent analysis thickness meter (manufactured by Seiko Instruments Inc.; SF13200), the sum of a film thickness of a Sn layer of a test material and a film thickness of a Sn component contained in a Cu—Sn alloy layer was measured. Thereafter, the Sn layer was removed by immersing in an aqueous solution containing p-nitrophenol and caustic soda as components for 10 minutes. Using an X-ray fluorescent analysis thickness meter, a film thickness of a Sn component contained in a Cu—Sn alloy layer was measured again. Regarding the measurement conditions, a single-layer calibration curve of Sn/base material or a two-layer calibration curve of Sn/Ni/base material was used as a calibration curve, and a collimeter diameter was set at φ0.5 mm. The average thickness of the Sn layer was calculated by subtracting the film thickness of a Sn component contained in a Cu—Sn alloy layer from the thus obtained sum of a film thickness of a Sn layer and a film thickness of a Sn component contained in a Cu—Sn alloy layer.

(Test of Thermal Peeling Resistance After Heating at High Temperature Over Long Time)

Figure 2:
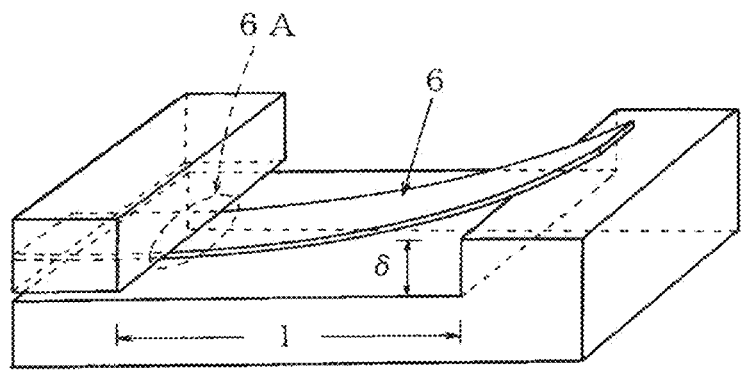
FIG. 2 is a perspective view for explaining a test jig used in a test of thermal peeling resistance, and a test method.

A test specimen having a width of 10 mm and a length of 100 mm (length direction is the rolling parallel direction) was cut out from a test material, and deflection displacement δ was applied to a position of the length 1 of the test specimen 6 by a cantilever type test jig shown in FIG. 2 and then 80% bending stress of 0.2% proof stress at room temperature was applied to the test specimen 6. In this case, a compressive force is applied to an upper surface of test specimen 6 and a tensile force is applied to a lower surface. In this state, the test specimen 6 was heated in atmospheric air at 160° C. for 1,000 hours followed by removing the stress. This test method is based on Technical Standards of The Japan Copper and Brass Association JCBAT309:2004, "Method for Stress Relaxation Test of Copper and Copper Alloy Thin Sheet Strip due to Bending". In Examples, the deflection displacement δ was set at 10 mm and the span length l was determined by the formula mentioned in the test method.

Figure 3A:
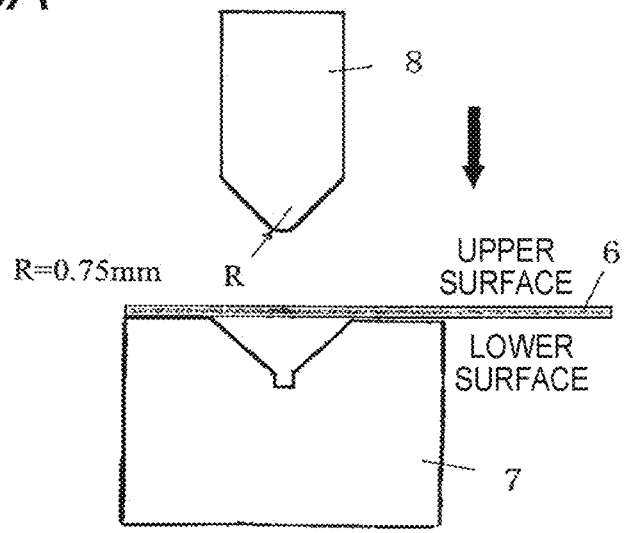
FIG. 3A is a diagram for explaining 90° bending and return bending after heating at high temperature over a long time which is performed in a test of thermal peeling resistance.
Figure 3B:
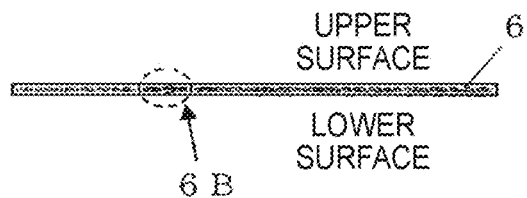
FIG. 3B is a diagram for explaining 90° bending and return bending after heating at high temperature over a long time which is performed in a test of thermal peeling resistance.

After heating, the test specimen 6 was subjected to 90° bending (FIG. 3A) at a bending radius R=0.75 mm and return bending (FIG. 3B). In FIG. 3A, the reference numeral 7 denotes a V-shaped block and 8 denotes a pressing metal fitting. In the case of 90° bending, a surface, to which a compressive force was applied by a test jig shown in FIG. 2, was directed upward and a portion 6A serving as a fulcrum when stress is applied was allowed to agree with a bend line.

A transparent resin tape was pasted on both sides of a bend section 6B and peeled off, and then it was confirmed whether or not the surface coating layer is adhered to the tape (whether or not peeling occurs). The case where no peeling occurred in three test specimens was rated "Good", whereas, the case where peeling occurred in any one of test specimens was rated "Bad".

The test specimen 6 was cut at a cross-section including the bend section 6B (cross-section vertical to the bend line), After resin embedding and polishing, it was observed whether or not voids and peeling are observed at an interface between a Ni layer and a Cu—Sn alloy layer, using a scanning electron microscope. The case where neither voids nor peeling were (was) observed was rated "Good", whereas, the case where voids or peeling were (was) observed was rated "Bad".

(Measurement of Thickness of $Cu_2O$ Oxide Film)

A test specimen having a width of 10 mm and a length of 100 ram (length direction is the rolling parallel direction) was Cut out from a test material, and then 80% bending stress of 0.2% proof stress at room temperature was applied to the test specimen in the same manner as in the test of thermal peeling resistance (see FIG. 2). In this state, the test specimen was heated in atmospheric air at 160° C. for 1,000 hours followed by removing the stress. After the heating, a surface coating layer of the test specimen was etched under the conditions where an etching rate to Sn becomes about 5 nm/min for 3 minutes, and then it was confirmed whether or not $Cu_2O$ exists, using an X-ray photoelectron spectrometer (ESCA-LAB210D, manufactured by VG). The analysis conditions as follows; AlKα 300 W (15 kV, 20 mA), and analysis area: 1 mmφ. If $Cu_2O$ was detected, it was judged that $Cu_2O$ exists at a position deeper than 15 nm from the outermost surface (thickness of $Cu_2O$ oxide film exceeds 15 nm ($Cu_2O$>15 nm)). If $Cu_2O$ was not detected, it was judged that $Cu_2O$ does not exist at a position deeper than 15 nm from the outermost surface (thickness of $Cu_2O$ oxide film is 15 nm or less ($Cu_2O$≤15 nm)).

(Measurement of Contact Resistance After Heating at High Temperature Over Long Time)

A test specimen having a width of 10 mm and a length of 100 mm (length direction is the rolling parallel direction) was cut out from a test material, and then 80% bending stress of 0.2% proof stress at room temperature was applied to the test specimen in the same manner as in the test of thermal peeling resistance (see FIG. 2). In this state, the test specimen was heated in atmospheric air at 160° C. for 1,000 hours followed by removing the stress. Using the test specimen after heating, contact resistance was measured five times by a four-terminal method under the conditions of an open-circuit voltage of 20 mV, a current of 10 mA, and a load of 3 N with sliding. The average was regarded as contact resistivity. In a single measurement, a sliding distance was set at 1 mm and adjustment was made such that a load increase in proportion to a sliding distance after initiation of sliding, and the load becomes 10 N when a probe is slided by 1 mm. In this test, contact resistance is contact resistance when the probe is slided by only 0.3 mm (load is 3 N). In the measurement of contact resistance, an electric contact point simulator CRS-1103AU manufactured by YAMASAKI-SEIKI CO., LTD. was used.

(Surface Roughness of Surface Coating Layer)

Surface roughness of a surface coating layer (arithmetic average roughness Ra) was measured based on JISB0601-1994, using a contact type surface roughness meter (TOKYO SEIMITSU CO., LTD; SURFCOM 1400). The surface roughness measurement conditions are as follows; cut-off value: 0.8 mm, reference length: 0.8 mm, evaluation length: 4.0 mm, measurement rate: 0.3 mm/s, and probe tip radius: 5 μmR. The surface roughness measurement direction was the rolling vertical direction where surface roughness becomes largest.

(Measurement of Exposed Surface Area Ratio of Cu—Sn Alloy Layer)

A surface of a test material was observed at a magnification of 200 times, using a scanning electron microscope (SEM) equipped with an energy dispersive X-ray spectrometer (EDX), and then a surface exposed area ratio of a Cu—Sn alloy layer was measured from the density of the thus obtained composition image (excluding contrast such as stain and flow) by image analysis. At the same time, the exposure conformation of the Cu—Sn alloy layer was observed. The exposure conformation was composed of a random structure, or a linear structure and a random structure, and the linear structure was entirely formed in the rolling parallel direction.

(Measurement of Friction Coefficient)

Figure 4:
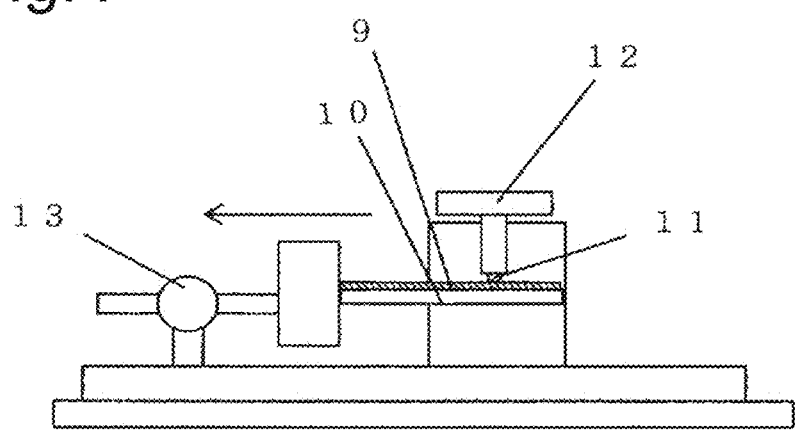
FIG. 4 is a conceptual diagram of a jig for measurement of a friction coefficient.

By simulating the shape of an indent section of an electric contact point in fitting type connection components, measurement was made using a device as shown in FIG. 4. First, a male test specimen 9 of a sheet material cut out from each of the test materials Nos. 1 to 32 and 51 to 55 was fixed to a horizontal table 10 and a female test specimen 11 cut out from a test material No. 32 of a semispherical machined material (inner diameter is φ1.5 mm) was placed, and then surfaces are brought into contact with each other.

Subsequently, the male test specimen 9 was pressed by applying 3.0 N of a load (weight 12) to the female test specimen 11. Using a horizontal type load cell (AIKOH ENGINEERING CO., LTD.; Model-2152), the male test specimen 9 was pulled in the horizontal direction (sliding rate is 80 mm/min) and a maximum frictional force F (unit: N) until reaching a sliding distance of 5 mm was measured. A friction coefficient was determined by the formula (1) mentioned below.

The reference numeral 13 denotes a load cell, arrow denotes a sliding direction, and the sliding direction was the direction vertical to the rolling direction.

$$\text{Friction coefficient} = F/3.0 \quad (1)$$

TABLE 2

| No. | Alloy | Thickness of surface coating layer (μm) Ground* | Thickness of surface coating layer (μm) Cu—Sn | Thickness of surface coating layer (μm) Sn | Arithmetic average roughness Ra of surface coating layer (μm) | Thickness ratio of ε phase (%) | Length ratio of ε phase (%) | Thickness of $Cu_2O$ (nm) | Exposure conformation of Cu—Sn alloy layer | Exposure ratio of Cu—Sn alloy layer (%) | Contact resistance after heating at high temperature (mΩ) | Thermal peeling resistance Peeling of tape | Thermal peeling resistance Ground/Cu—Sn interface | Friction coefficient |
|---|---|---|---|---|---|---|---|---|---|---|---|---|---|---|
| 1 | A | Ni: 0.2 | 0.45 | 0.23 | 1.06 | 5 | 13 | ≤15 | Linear + Random | 55 | 1.0 | Good | Good | 0.25 |
| 2 | B | Ni: 0.4 | 0.50 | 0.45 | 0.65 | 13 | 23 | ≤15 | Linear + Random | 53 | 0.9 | Good | Good | 0.24 |
| 3 | B | Ni: 0.4 | 0.55 | 0.40 | 0.89 | 12 | 24 | ≤15 | Linear + Random | 61 | 0.9 | Good | Good | 0.22 |
| 4 | B | Ni: 0.5 | 0.75 | 0.95 | 0.76 | 0 | 0 | ≤15 | Random | 35 | 0.7 | Good | Good | 0.41 |
| 5 | B | Ni: 0.3 | 0.60 | 0.40 | 0.64 | 0 | 0 | ≤15 | Random | 55 | 0.9 | Good | Good | 0.23 |
| 6 | B | Ni: 0.4 | 0.55 | 0.40 | 0.23 | 0 | 0 | ≤15 | Random | 31 | 0.8 | Good | Good | 0.36 |
| 7 | B | Ni: 0.4 | 0.35 | 0.60 | 0.42 | 18 | 33 | ≤15 | Random | 5 | 0.8 | Good | Good | 0.44 |
| 8 | B | Ni: 0.2 | 0.30 | 0.09 | 0.80 | 0 | 0 | ≤15 | Random | 59 | 0.9 | Good | Good | 0.26 |
| 9 | B | Ni: 0.6 | 0.55 | 0.15 | 0.91 | 0 | 0 | ≤15 | Linear + Random | 54 | 0.8 | Good | Good | 0.19 |
| 10 | B | Ni: 0.4 | 0.75 | 0.45 | 1.40 | 0 | 0 | ≤15 | Random | 42 | 0.6 | Good | Good | 0.31 |
| 11 | B | Co: 0.5 | 0.70 | 0.40 | 0.97 | 0 | 0 | ≤15 | Linear + Random | 52 | 0.6 | Good | Good | 0.24 |
| 12 | B | Fe: 0.5 | 0.70 | 0.35 | 0.92 | 0 | 0 | ≤15 | Linear + Random | 50 | 0.7 | Good | Good | 0.22 |

TABLE 2-continued

| No. | Alloy | Thickness of surface coating layer (μm) Ground* | Cu—Sn | Sn | Arithmetic average roughness Ra of surface coating layer (μm) | Thickness ratio of ε phase (%) | Length ratio of ε phase (%) | Thickness of Cu₂O (nm) | Exposure conformation of Cu—Sn alloy layer | Exposure ratio of Cu—Sn alloy layer (%) | Contact resistance after heating at high temperature (mΩ) | Thermal peeling resistance Peeling of tape | Ground/Cu—Sn interface | Friction coefficient |
|---|---|---|---|---|---|---|---|---|---|---|---|---|---|---|
| 13 | B | Ni: 0.4 Co: 0.2 | 0.45 | 0.35 | 0.75 | 0 | 0 | ≤15 | Random | 41 | 0.6 | Good | Good | 0.27 |
| 14 | B | Ni: 0.3 Fe: 0.3 | 0.50 | 0.40 | 0.83 | 0 | 0 | ≤15 | Random | 48 | 0.6 | Good | Good | 0.29 |
| 15 | B | Co: 0.3 Ni: 0.3 | 0.60 | 0.35 | 0.91 | 0 | 0 | ≤15 | Random | 52 | 0.6 | Good | Good | 0.26 |
| 16 | C | Ni: 0.6 | 0.65 | 0.40 | 0.95 | 0 | 0 | ≤15 | Linear + Random | 55 | 0.8 | Good | Good | 0.24 |
| 17 | C | Ni: 2.4 | 0.80 | 0.35 | 0.79 | 0 | 0 | ≤15 | Linear + Random | 58 | 0.5 | Good | Good | 0.21 |
| 18 | B | Ni: 0.4 | 0.50 | 0.45 | 0.65 | 28 | 52 | ≤15 | Random | 53 | 0.9 | Bad | Bad | 0.24 |
| 19 | B | Ni: 0.6 | 0.50 | 0.45 | 0.22 | 0 | 0 | ≤15 | Linear + Random | 42 | 0.8 | Good | Good | 0.39 |
| 20 | A | Ni: 0.4 | 0.55 | 0.25 | 0.30 | 3 | 19 | ≤15 | Random | 40 | 0.8 | Good | Good | 0.28 |
| 51 | D | Ni: 0.4 | 0.45 | 0.60 | 0.53 | 10 | 15 | ≤15 | Linear + Random | 28 | 0.9 | Good | Good | 0.35 |
| 52 | E | Co: 0.6 | 0.30 | 0.30 | 0.26 | 25 | 43 | ≤15 | Random | 23 | 0.8 | Good | Good | 0.24 |
| 53 | F | Ni: 0.3 Co: 0.3 | 0.60 | 0.45 | 0.73 | 0 | 0 | ≤15 | Random | 32 | 0.7 | Good | Good | 0.34 |
| 54 | G | Ni: 0.6 | 0.45 | 0.60 | 0.40 | 5 | 10 | ≤15 | Linear + Random | 24 | 0.9 | Good | Good | 0.40 |
| 55 | G | Ni: 0.4 Fe: 0.3 | 0.45 | 0.55 | 0.51 | 0 | 0 | ≤15 | Random | 26 | 0.8 | Good | Good | 0.34 |

*When a ground layer is composed of two layers, an upper layer is in contact with a Cu—Sn alloy layer and a lower layer is in contact with a base material.

TABLE 3

| No. | Alloy | Thickness of surface coating layer (μm) Ground* | Cu—Sn | Sn | Arithmetic average roughness Ra of surface coating layer (μm) | Thickness ratio of ε phase (%) | Length ratio of ε phase (%) | Thickness of Cu₂O (nm) | Exposure conformation of Cu—Sn alloy layer | Exposure ratio of Cu—Sn alloy layer (%) | Contact resistance after heating at high temperature (mΩ) | Thermal peeling resistance Peeling of tape | Ground/Cu—Sn interface | Friction coefficient |
|---|---|---|---|---|---|---|---|---|---|---|---|---|---|---|
| 21 | B | Ni: 0.05 | 0.45 | 0.40 | 0.83 | 20 | 38 | ≤15 | Random | 50 | 5.2 | Good | Good | 0.33 |
| 22 | B | Ni: 0.5 | 0.05 | 1.00 | 0.86 | 5 | 13 | >15 | Random | 34 | 11.0 | Good | Good | 0.41 |
| 23 | B | Ni: 0.5 | 0.50 | 0 | 0.84 | 10 | 27 | >15 | Random | 100 | 6.3 | Good | Good | 0.61 |
| 24 | B | Ni: 0.5 | 0.50 | 0.25 | 0.87 | 50 | 80 | >15 | Random | 61 | 6.9 | Bad | Bad | 0.25 |
| 25 | B | — | 0.55 | 0.60 | 0.95 | 10 | 25 | >15 | Random | 43 | 9.5 | Good | — | 0.38 |
| 26 | B | Ni: 0.5 | 0.65 | 0.50 | 0.86 | 34 | 48 | >15 | Random | 48 | 1.4 | Bad | Bad | 0.30 |
| 27 | B | Ni: 0.5 | 0.55 | 0.50 | 0.81 | 38 | 65 | >15 | Random | 53 | 4.2 | Bad | Bad | 0.29 |
| 28 | B | Ni: 0.5 | 0.50 | 0.04 | 0.84 | 4 | 11 | >15 | Random | 68 | 2.7 | Good | Good | 0.36 |
| 29 | C | Co: 0.4 | 0.50 | 0.30 | 0.85 | 45 | 68 | >15 | Random | 60 | 4.7 | Bad | Bad | 0.25 |
| 30 | C | Ni: 0.4 | 0.50 | 0.35 | 0.81 | 34 | 46 | >15 | Random | 57 | 1.6 | Bad | Bad | 0.32 |
| 31 | C | Ni: 0.4 | 0.50 | 0.03 | 0.77 | 0 | 0 | >15 | Random | 63 | 2.4 | Good | Good | 0.47 |
| 32 | C | Ni: 0.6 | 0.65 | 0.65 | 0.07 | 0 | 0 | ≤15 | Not exposed | 0 | 0.7 | Good | Good | 0.47 |

The above results are shown in Tables 2 and 3.

In the test materials Nos. 1 to 20 and 51 to 55 in which structure of a surface coating layer, an average thickness of each layer, and a thickness ratio of a ε phase, as well as a surface exposure ratio of a Cu—Sn alloy layer of a surface coating layer and surface roughness of a surface coating layer satisfy the provisions of the present invention, contact resistance after heating at high temperature over a long time is maintained at a low value of 1.0 mΩ or less. Of these, the test materials Nos. 1 to 17, 19, 20 and 51 to 55, in which ε phase length ratio satisfies the provisions of the present invention, are also excellent in thermal peeling resistance. In the test materials Nos. 1 to 20, a friction coefficient is low as compared with the test material No. 32 in which a surface exposure ratio of a Cu—Sn alloy layer is 0.

Meanwhile, in the test materials Nos. 24, 26, 27, 29 and 30 in which a ε phase thickness ratio is large, contact resistance after heating at high temperature over a long time is high and also thermal peeling resistance is inferior.

In the test material No. 21 in which a ground Ni layer has a small average thickness, the test material No. 25 including no ground layer, and the test material No. 22 in which a Cu—Sn alloy layer has a small average thickness, contact resistance after heating at high temperature over a long time is high. In the test material No. 23 in which a Sn layer disappeared, and the test materials Nos. 28 and 31 in which a Sn layer has a small average thickness, contact resistance after heating at high temperature over a long time increased. In the test material No. 32 in which a Cu—Sn alloy layer exposure ratio is 0, a friction coefficient is high. In the test materials Nos. 24, 26, 27 and 28, arithmetic average roughness of a surface coating layer Ra and a Cu—Sn alloy layer exposure ratio satisfy the provisions of the present invention, and a friction coefficient is low.

In the test materials Nos. 1 to 17, 19 to 23, 28, 31, 32 and 51 to 55 in which peeling of a surface coating layer did not occur, voids were not formed at an interface between a Ni layer and a Cu—Sn alloy layer. However, in the test materials Nos. 18, 24, 26, 27, 29 and 30 in which peeling of a surface coating layer occurred, numerous voids were formed at the interface. In the test material 25, observation of voids was not performed.

The present invention includes the following aspects.

Aspect 1:

A copper alloy sheet strip with a surface coating layer excellent in heat resistance, including a copper alloy sheet strip, as a base material, consisting of 1.0 to 4.5% by mass of one or more of Ni and Co and 0.2 to 1.0% by mass of Si, with the balance being copper and inevitable impurities; and the surface coating layer composed of a Ni layer, a Cu—Sn alloy layer, and a Sn layer formed on a surface of the copper alloy sheet strip in this order; wherein the Ni layer has an average thickness of 0.1 to 3.0 μm, the Cu—Sn alloy layer has an average thickness of 0.2 to 3.0 μm, and the Sn layer has an average thickness of 0.05 to 5.0 μm; wherein the Cu—Sn alloy layer is composed of a η layer, and the Cu—Sn alloy layer is partially exposed on the outermost surface of the surface coating layer and a surface exposed area ratio thereof is in a range of 3 to 75%; and wherein surface roughness of the surface coating layer is 0.15 μm or more in terms of arithmetic average roughness Ra in at least one direction, and 3.0 μm or less in terms of arithmetic average roughness Ra in all directions.

Aspect 2:

The copper alloy sheet strip with a surface coating layer excellent in heat resistance according to the aspect 1, wherein the base material has an average grain size of 10 μm or less and standard deviation σ of the grain size satisfies the inequality expression: 2σ<10 μm, and the existing amount of dispersed particles having a grain size of 30 to 300 nm existing on grain boundaries is 500 particles/mm or more.

Aspect 3:

A copper alloy sheet strip with a surface coating layer excellent in heat resistance, including a copper alloy sheet strip, as a base material, consisting of 0.8 to 4.5% by mass of one or more of Ni and Co and 0.2 to 1.0% by mass of Si, with the balance being copper and inevitable impurities; and the surface coating layer composed of a Ni layer, a Cu—Sn alloy layer, and a Sn layer formed on a surface of the copper alloy sheet strip in this order; wherein the Ni layer has an average thickness of 0.1 to 3.0 μm, the Cu—Sn alloy layer has an average thickness of 0.2 to 3.0 μm, and the Sn layer has an average thickness of 0.05 to 5.0 μm; wherein the Cu—Sn alloy layer is composed of a ε phase and a n layer, the ε phase existing between the Ni layer and the η phase, and a ratio of the average thickness of the ε phase to the average thickness of the Cu—Sn alloy layer being 30% or less; wherein the Cu—Sn alloy layer is partially exposed on the outermost surface of the surface coating layer and a surface exposed area ratio thereof is in a range of 3 to 75%; and wherein surface roughness of the surface coating layer is 0.15 μm or more in terms of arithmetic average roughness Ra in at least one direction, and 3.0 μm or less in terms of arithmetic average roughness Ra in all directions.

Aspect 4:

The copper alloy sheet strip with a surface coating layer excellent in heat resistance according to the aspect 3, wherein the base material has an average grain size of 10 μm or less, and standard deviation a of the grain size satisfies the inequality expression: 2σ<10 μm, and the existing amount of dispersed particles having a grain size of 30 to 300 nm existing on grain boundaries is 500 particles/mm or more.

Aspect 5:

The copper alloy sheet strip with a surface coating layer excellent in heat resistance according to the aspect 3 or 4, wherein in a cross-section of the surface coating layer, a ratio of the length of a ε phase to the length of the ground layer is 50% or less.

Aspect 6:

The copper alloy sheet strip with a surface coating layer excellent in heat resistance according to any one of the aspects 1 to 5, wherein the copper alloy sheet strip, as a base material, further includes one or more of: Sn: 0.01 to 1.3% by mass, and Mg: 0.005 to 0.2% by mass.

Aspect 7:

The copper alloy sheet strip with a surface coating layer excellent in heat resistance according to any one of the aspects 1 to 6, wherein the copper alloy sheet strip, as a base material, further includes: Zn: 0.01 to 5% by mass.

Aspect 8:

The copper alloy sheet strip with a surface coating layer excellent in heat resistance according to any one of the aspects 1 to 7, wherein the copper alloy sheet strip as a base material further includes one or more of: Mn: 0.01 to 0.5% by mass, and Cr: 0.001 to 0.3% by mass.

Aspect 9:

The copper alloy sheet strip with a surface coating layer excellent in heat resistance according to any one of the aspects 1 to 8, wherein the copper alloy sheet strip, as a base material, includes one or more element(s) selected from the group consisting of B, C, P, S, Ca, V. Ga, Ge, Nb, Mo, Hf, Ta, Bi and Pb: 0.0001 to 0.1% by mass respectively and 0.1% by mass or less in total, one or more element(s) selected from the group consisting of Be, Al, Ti, Fe, Zr, Ag, Cd, In, Sb, Te and Au: 0.001 to 1% by mass respectively and 1% by mass or less in total, and both element groups: 1% by mass or less in total.

Aspect 10:

The copper alloy sheet strip with a surface coating layer excellent in heat resistance according to any one of the aspects 1 to 10, wherein a Co layer or a Fe layer is formed as a ground layer in place of the Ni layer, and the Co layer or the Fe layer has an average thickness of 0.1 to 3.0 μm.

Aspect 11:

The copper alloy sheet strip with a surface coating layer excellent in heat resistance according to any one of the aspects 1 to 11, wherein a Co layer or a Fe layer is formed between a surface of the base material and a Ni layer, or between the Ni layer and a Cu—Sn alloy layer, and the total average thickness of the Ni layer and the Co layer or the Ni layer and the Fe layer is in a range of 0.1 to 3.0 μm.

Aspect 12:

The copper alloy sheet strip with a surface coating layer excellent in heat resistance according to any one of the aspects 1 to 11, wherein, on the material surface after heating in atmospheric air 160° C. for 1,000 hours, $Cu_2O$ does not exist at a position deeper than 15 nm from the outermost surface.

This application claims priority based on Japanese Patent Application No. 2014-030398 filed on Feb. 20, 2014, the disclosure of which is incorporated by reference herein.

DESCRIPTION OF REFERENCE NUMERALS

1 Copper alloy base material
2 Surface plating layer
3 Ni layer
4 Cu—Sn alloy layer
4a ε Phase
4b η phase
5 Sn layer

The invention claimed is:

1. A copper alloy sheet strip with a surface coating layer, comprising:
 a copper alloy sheet strip comprising copper, 1.0 to 4.5% by mass of at least one of Ni and Co and 0.2 to 1.0% by mass of Si, based on a total amount of the copper alloy sheet strip; and
 a surface coating layer comprising a Ni layer, a Cu—Sn alloy layer and a Sn layer formed on a surface of the copper alloy sheet strip in this order,
 wherein the Ni layer has an average thickness of 0.1 to 3.0 μm, the Cu—Sn alloy layer has an average thickness of 0.2 to 3.0 μm, and the Sn layer has an average thickness of 0.05 to 5.0 μm,
 wherein the Cu—Sn alloy layer comprises a ε phase and a η phase, the ε phase existing between the Ni layer and the η phase, a ratio of the average thickness of the ε phase to the average thickness of the Cu—Sn alloy layer being 30% or less, and a ratio of the length of the ε phase to the length of the Ni layer being 50% or less,
 wherein the Cu—Sn alloy layer is partially exposed on an outermost surface of the surface coating layer such that a surface exposed area ratio thereof is in a range of 3 to 75%, a surface roughness of the surface coating layer is 0.15 μm or more in terms of arithmetic average roughness Ra in at least one direction, and 3.0 μm or less in terms of arithmetic average roughness Ra in all directions, and
 wherein the copper alloy sheet strip with the surface coating layer has a contact resistance 1.0 mΩ or less after being heated at 160° C. for 1,000 hours while bending stress is applied.

2. The copper alloy sheet strip with the surface coating layer according to claim 1, wherein the copper alloy sheet strip has an average grain size of 10 μm or less and a standard deviation σ of the grain size satisfies: 2σ<10 μm, and an amount of dispersed particles having a grain size of 30 to 300 nm existing on grain boundaries is 500 particles/mm or more.

3. The copper alloy sheet strip with the surface coating layer according to claim 1, wherein the copper alloy sheet strip further comprises at least one element selected from the group consisting of 0.01 to 1.3% by mass of Sn, 0.005 to 0.2% by mass of Mg, 0.01 to 5% by mass of Zn, 0.01 to 0.5% by mass of Mn, 0.001 to 0.3% by mass of Cr, and 0.005 to 0.15% by mass of P, based on the total amount of the copper alloy sheet strip.

4. The copper alloy sheet strip with a surface coating layer according to claim 3, wherein the copper alloy sheet strip further comprises:
 (i) at least one element selected from the group consisting of B, C, S, Ca, V, Ga, Ge, Nb, Mo, Hf, Ta, Bi and Pb, in an amount of 0.0001 to 0.1% by mass respectively and 0.1% by mass or less in total, based on the total amount of the copper alloy sheet strip, and
 (ii) at least one element selected from the group consisting of Be, Al, Ti, Fe, Zr, Ag, Cd, In, Sb, Te and Au, in an amount of 0.001 to 1% by mass respectively and 1% by mass or less in total, based on the total amount of the copper alloy sheet strip,
 wherein a total amount of the elements (i) and (ii) is 1% by mass or less, based on the total amount of the copper alloy sheet strip.

5. The copper alloy sheet strip with the surface coating layer according to claim 3, wherein a Co layer or a Fe layer is formed between a surface of the copper alloy sheet strip and the Ni layer, or between the Ni layer and the Cu—Sn alloy layer, and a total average thickness of the Ni layer and the Co layer or the Ni layer and the Fe layer is in a range of 0.1 to 3.0 μm.

6. The copper alloy sheet strip with the surface coating layer according to claim 5, wherein, on a material surface after heating in atmospheric air at 160° C. for 1,000 hours, $Cu_2O$ does not exist at a position deeper than 15 nm from the outermost surface.

7. The copper alloy sheet strip with the surface coating layer according to claim 3, wherein, on a material surface after heating in atmospheric air at 160° C. for 1,000 hours, $Cu_2O$ does not exist at a position deeper than 15 nm from the outermost surface.

8. The copper alloy sheet strip with the surface coating layer according to claim 1, wherein the copper alloy sheet strip further comprises:
 (i) at least one element selected from the group consisting of B, C, S, Ca, V, Ga, Ge, Nb, Mo, Hf, Ta, Bi and Pb, in an amount of 0.0001 to 0.1% by mass respectively and 0.1% by mass or less in total, based on the total amount of the copper alloy sheet strip, and
 (ii) at least one element selected from the group consisting of Be, Al, Ti, Fe, Zr, Ag, Cd, In, Sb, Te and Au, in an amount of 0.001 to 1% by mass respectively and 1% by mass or less in total, based on the total amount of the copper alloy sheet strip,
 wherein a total amount of the elements (i) and (ii) is 1% by mass or less, based on the total amount of the copper alloy sheet strip.

9. The copper alloy sheet strip with a surface coating layer according to claim 1, wherein a Co layer or a Fe layer is formed between a surface of the copper alloy sheet strip and the Ni layer, or between the Ni layer and the Cu—Sn alloy layer, and a total average thickness of the Ni layer and the Co layer or the Ni layer and the Fe layer is in a range of 0.1 to 3.0 μm.

10. The copper alloy sheet strip with the surface coating layer according to claim 9, wherein, on a material surface after heating in atmospheric air at 160° C. for 1,000 hours, $Cu_2O$ does not exist at a position deeper than 15 nm from the outermost surface.

11. The copper alloy sheet strip with the surface coating layer according to claim 1, wherein, on a material surface after heating in atmospheric air at 160° C. for 1,000 hours, $Cu_2O$ does not exist at a position deeper than 15 nm from the outermost surface.

12. The copper alloy sheet strip with the surface coating layer according to claim 1, wherein the surface roughness of the surface coating layer is 0.20 μm or more in terms of arithmetic average roughness Ra in at least one direction.

13. The copper alloy sheet strip with the surface coating layer according to claim 1, wherein the surface roughness of the surface coating layer is 0.20 μm or more in terms of arithmetic average roughness Ra in at least one direction, and 2.0 μm or less in terms of arithmetic average roughness Ra in all directions.

14. The copper alloy sheet strip with the surface coating layer according to claim 1, wherein the Cu—Sn alloy layer is partially exposed on the outermost surface of the surface coating layer such that the surface exposed area ratio thereof is in a range of 10 to 60%.

15. A copper alloy sheet strip with a surface coating layer, comprising:
   a copper alloy sheet strip comprising copper, 1.0 to 4.5% by mass of one or more of Ni and Co and 0.2 to 1.0% by mass of Si, based on a total amount of the copper alloy sheet strip; and
   a surface coating layer comprising a Co layer or a Fe layer, a Cu—Sn alloy layer and a Sn layer formed on a surface of the copper alloy sheet strip in this order,
   wherein the Co layer or Fe layer has an average thickness of 0.1 to 3.0 μm, the Cu—Sn alloy layer has an average thickness of 0.2 to 3.0 μm, and the Sn layer has an average thickness of 0.05 to 5.0 μm,
   wherein the Cu—Sn alloy layer comprises a ε phase and a η phase, the ε phase existing between the Co layer or Fe layer and the η phase, a ratio of the average thickness of the ε phase to the average thickness of the Cu—Sn alloy layer being 30% or less, and a ratio of the length of the ε phase to the length of the Co layer or Fe layer being 50% or less,
   wherein the Cu—Sn alloy layer is partially exposed on an outermost surface of the surface coating layer such that a surface exposed area ratio thereof is in a range of 3 to 75%, a surface roughness of the surface coating layer is 0.15 μm or more in terms of arithmetic average roughness Ra in at least one direction, and 3.0 μm or less in terms of arithmetic average roughness Ra in all directions, and
   wherein the copper alloy sheet strip with the surface coating layer has a contact resistance 1.0 mΩ or less after being heated at 160° C. for 1,000 hours while bending stress is applied.

16. The copper alloy sheet strip with the surface coating layer according to claim 15, wherein the copper alloy sheet strip further comprises at least one element selected from the group consisting of 0.01 to 1.3% by mass of Sn, 0.005 to 0.2% by mass of Mg, 0.01 to 5% by mass of Zn, 0.01 to 0.5% by mass of Mn, 0.001 to 0.3% by mass of Cr, and 0.005 to 0.15% by mass of P, based on the total amount of the copper alloy sheet strip.

17. The copper alloy sheet strip with the surface coating layer according to claim 16, wherein, on a material surface after heating in atmospheric air at 160° C. for 1,000 hours, $Cu_2O$ does not exist at a position deeper than 15 nm from the outermost surface.

18. The copper alloy sheet strip with the surface coating layer according to claim 15, wherein, on a material surface after heating in atmospheric air at 160° C. for 1,000 hours, $Cu_2O$ does not exist at a position deeper than 15 nm from the outermost surface.

19. The copper alloy sheet strip with the surface coating layer according to claim 15, wherein the surface roughness of the surface coating layer is 0.20 μm or more in terms of arithmetic average roughness Ra in at least one direction.

20. The copper alloy sheet strip with the surface coating layer according to claim 15, wherein the surface roughness of the surface coating layer is 0.20 μm or more in terms of arithmetic average roughness Ra in at least one direction, and 2.0 μm or less in terms of arithmetic average roughness Ra in all directions.

* * * * *